(No Model.) 3 Sheets—Sheet 2.

W. HULL.
COMBINED DRAG BAR, CULTIVATOR AND DRILL.

No. 517,925. Patented Apr. 10, 1894.

Witnesses  
J. Edw. Maybee  
A. M. Neff

Inventor  
Wm Hull  
by John G. Ridout  
Atty (No Model.) 3 Sheets—Sheet 3.

W. HULL.
COMBINED DRAG BAR, CULTIVATOR, AND DRILL.

No. 517,925. Patented Apr. 10, 1894.

Witnesses
Fred Clarke
A. M. Neff

Inventor
Wm Hull
by John G. Ridout
Atty

United States Patent Office.

WILLIAM HULL, OF SOURIS, CANADA.

COMBINED DRAG-BAR CULTIVATOR AND DRILL.

SPECIFICATION forming part of Letters Patent No. 517,925, dated April 10, 1894.

Application filed September 26, 1893. Serial No. 486,560. (No model.)

*To all whom it may concern:*

Be it known that I, WILLIAM HULL, of Souris, in the district of Selkirk and Province of Manitoba, Canada, have invented a certain new and Improved Combined Drag-Bar Cultivator and Drill, of which the following is a specification.

The object of the invention is to provide a simple attachment that may be used with the frame of an ordinary drag bar seeder for the purpose of cultivation, with seed drilling or molding up the drills, and it consists, essentially, of a pair of shares connected to each drag bar of the seeder to which shares, seed spouts and seeding attachments or mold boards may be connected as desired, the whole being constructed in detail as hereinafter more particularly explained, and then definitely claimed.

Figure 1:
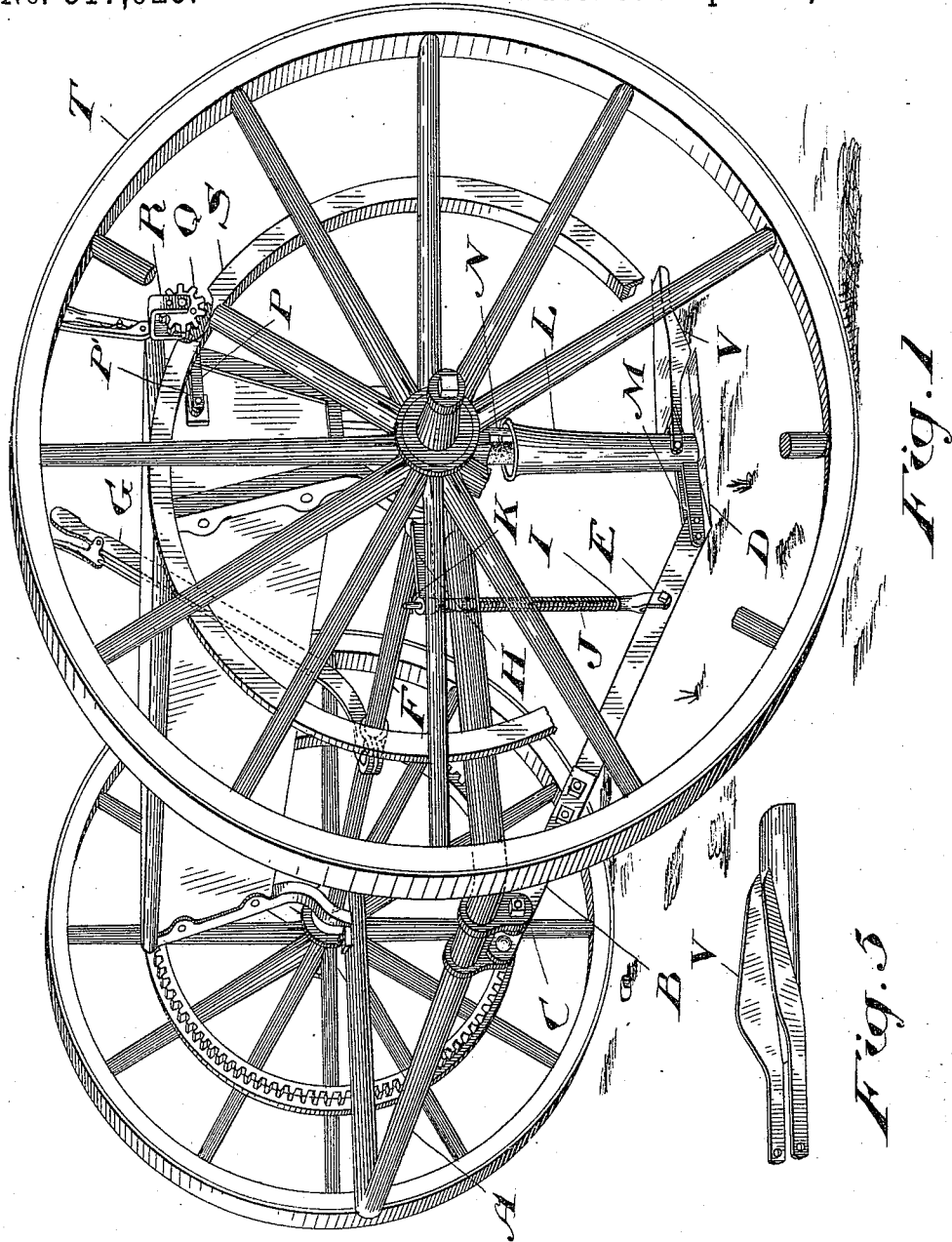
Figure 2:
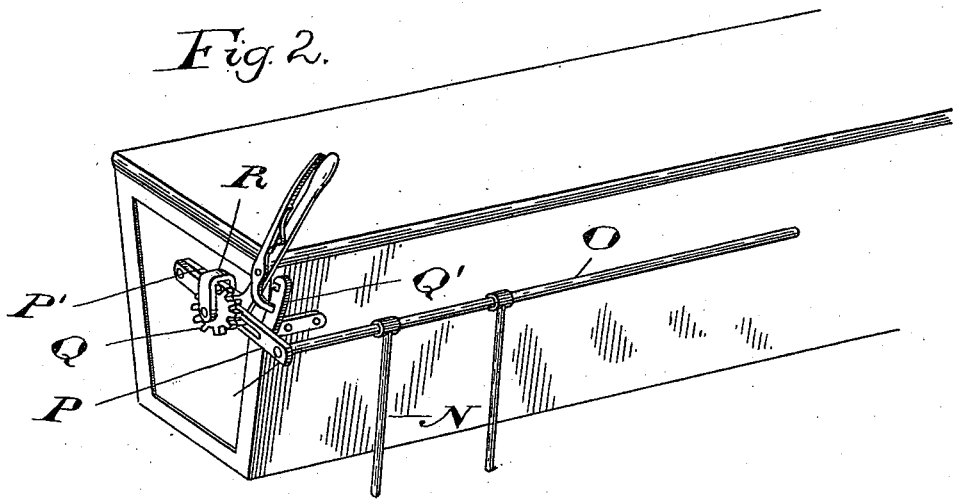
Figures 3, 4:
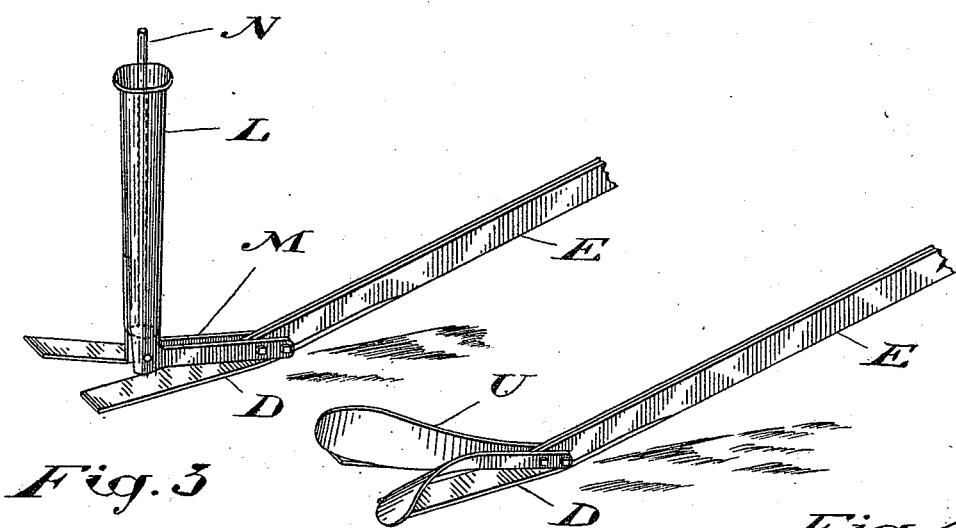
Figure 6:
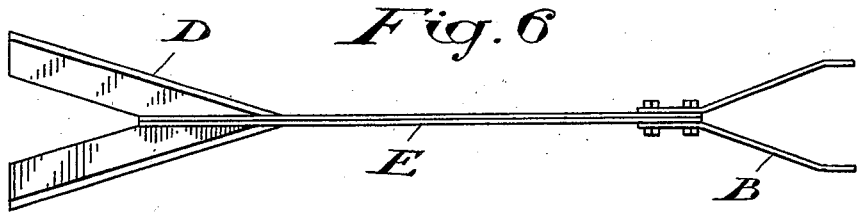
Figure 7:
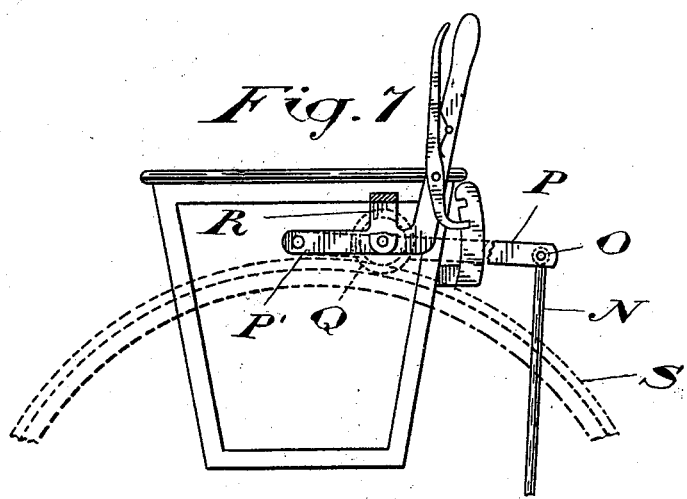
Figure 8:
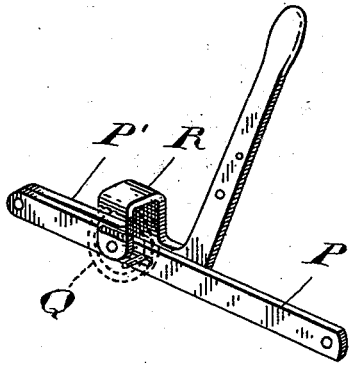

In the accompanying drawings Figure 1, is a perspective view of a seeder provided with my attachment, only one drag bar being shown in position. Fig. 2, is a perspective detail of a portion of the seeding attachment. Fig. 3, is a perspective detail of my attachment when used for drilling grain. Fig. 4, is a detail of my attachment as used in molding up drills. Fig. 5, is an inverted view of the seed covering attachment. Fig. 6 is a plan view of the shares. Fig. 7 is a side view of the mechanism for operating the rods in the seed boxes. Fig. 8 is a detail view of part of the same.

In the drawings—A, is the frame of a seeder, of ordinary construction.

B, is a drag bar connected to the frame by means of the lugs C. To this drag bar the shares D, are connected at their upper ends. These shares are composed of two flat rectangular bars E, of metal bolted together and turned outwardly and horizontally at their lower ends to form the V of the shares. These bars are preferably sharpened immediately above the point where they turn outwardly and downwardly, and the outer edges of the shares are also preferably sharpened to facilitate their entrance into the ground.

F, is a rock shaft operated by the hand lever G.

H, is an arm extending outwardly from the rock shaft F.

I, is a rod pivoted to the bars E, and extending upwardly through the outer end of the arm H.

J, is a spiral spring surrounding the rod I, between the arm H, and a shoulder formed on the lower end of the said rod.

From this construction it will be seen that by rocking the shaft F, a downward spring pressure may be applied to the shares $d$. A pin K, is placed in the upper end of the rod I, so that by rocking the shaft F, in the reverse direction, the shares G, may be raised clear of the ground. When used for drilling grain, a seed spout L, is connected to the shares by the arms M, substantially as shown, the open end of the spout being above the opening between the shares near the forward end.

N, is a vertical rod extending through the said spout L, to the ground. The upper end of this rod is connected to a shaft O. Each end of this shaft is connected to an arm P, pivoted on an arm P', pivoted on the end of the seed box and provided with a hand lever engaging with a notched quadrant Q', on the said box.

Q, is a gear pinion journaled in a bent arm R, connected to the arm P'. A pin projecting from the face of this pinion extends into a slot formed in the arm P, so that by revolving the said pinion, a rocking motion is conveyed to the said arm. This pinion Q meshes with the gear wheel S, attached or rigidly secured to the spokes of the ground wheel T. From this description it will be readily seen that a vertical reciprocating motion is given to the rods N, which thus make a series of holes or perforations in the ground for the reception of the seed which is fed into the seed spout L, in the ordinary way.

When my attachment is in use simply as a cultivator, the seed spouts L, are removed and the pinions are withdrawn from meshing with the gear wheels S, by rocking the arm P', by means of the hand lever.

When my attachment is to be used in molding up drills, I connect the mold boards U, above the shares D, as indicated in Fig. 4.

From the above description it will be readily seen that my cultivating attachment is of a very simple and effective nature and being constructed in two parts, it may be readily taken apart for the purpose of sharpening edges of the bar E, which act as a colter for the shares and also for sharpening the edges of the shares themselves, and it will also be seen that the seeding attachment may be very easily connected to or disconnected therefrom, and also that when desired, the mold boards are readily substituted for the purpose of cultivating and molding up the drills.

It should be mentioned that the mechanism for rocking the shaft O, is duplicated at the other end of the machine and that each drag bar is provided with the pressing, raising and seed sowing mechanism described.

It should be mentioned that if desired, a spring valve may be put into each seed spout to hold back the grain during the upward motion of the rod N. This valve is shown (in dotted lines) in Fig. 3.

In Fig. 5, is shown an inverted view of my improved seed covering device, which consists essentially of a casing formed with wedge-shaped sides V and jaws at its forward end to engage with the seed spout as shown. The wedge-shaped sides gather in the mold over the drill formed by the shares D, and the reciprocating rods N, and thus properly cover the seed sown.

Another function of the reciprocating rods N, is that of keeping the lower end of the seed spouts clear of mud when working in soft soil. Ordinary seed spouts are very apt to suffer in this way.

The weighted tail of the seed coverer serves to press down the earth above the seed.

What I claim as my invention is—

1. In a cultivator and seeder, a seed covering device pivotally connected with the seed-spout and having side walls converging together from the front rearwardly, and a weighted tail formed on said seed-covering device, substantially as described.

2. In a cultivator and seeder, a drag-bar, shares D having their lower ends turned outwardly and horizontally and their upper ends bolted together and to the drag-bar, substantially as described.

3. In a cultivator and seeder, rods N, rock-shaft O connected thereto, arm P carrying said rock-shaft, in combination with arm P', pivoted to said arm P pinion Q, carried by said arm P' and having a pin projecting therefrom acting on said arm P gear wheel S, and means for adjusting said arm P', substantially as described.

4. The combination in a cultivator, of rods N, rock-shaft O connected thereto, arm P carrying said shaft, arm P' connected with said arm P, pinion Q carried by said arm P', a quadrant Q', and a hand lever engaging said quadrant and arranged to adjust the pinion and levers, substantially as described.

5. In a cultivator and seeder, a drag bar, shares formed in two halves having their lower ends turned outwardly and horizontally, and their upper ends bolted together and to the drag bars, the lower and forward edges of said shares being sharpened, substantially as described.

Souris, August 31, 1893.

WILLIAM HULL.

In presence of—
   THOS. DICKIE,
   W. J. BARCLAY.